US012775843B2

(12) United States Patent
Wu et al.

(10) Patent No.: US 12,775,843 B2
(45) Date of Patent: Oct. 27, 2026

(54) QUANTIZATION METHOD AND QUANTIZATION APPARATUS FOR WEIGHT OF NEURAL NETWORK, AND STORAGE MEDIUM

(71) Applicant: TSINGHUA UNIVERSITY, Beijing (CN)

(72) Inventors: Huaqiang Wu, Beijing (CN); Qingtian Zhang, Beijing (CN); Lingjun Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 661 days.

(21) Appl. No.: 18/269,445

(22) PCT Filed: Dec. 13, 2021

(86) PCT No.: PCT/CN2021/137446

§ 371 (c)(1), (2) Date: Jun. 23, 2023

(87) PCT Pub. No.: WO2022/135209

PCT Pub. Date: Jun. 30, 2022

(65) Prior Publication Data

US 2024/0046086 A1 Feb. 8, 2024

(30) Foreign Application Priority Data

Dec. 25, 2020 (CN) ......................... 202011558175.6

(51) Int. Cl.
*G06N 3/08* (2023.01)

(52) U.S. Cl.
CPC ...................................... *G06N 3/08* (2013.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 11,675,676 B2 * 6/2023 Liu ..................... G06F 11/1476
714/1
11,748,615 B1 * 9/2023 Wu .......................... G06N 3/08
706/25

(Continued)

FOREIGN PATENT DOCUMENTS

CN 109389208 A 2/2019
CN 112598123 A 4/2021

*Primary Examiner* — Hung D Le
(74) *Attorney, Agent, or Firm* — Scully, Scott, Murphy & Presser, P.C.

(57) ABSTRACT

Disclosed are a quantization method and quantization apparatus for a weight of a neural network, and a storage medium. The neural network is implemented on the basis of a crossbar-enabled analog computing-in-memory (CACIM) system, and the quantization method includes: acquiring a distribution characteristic of a weight; and determining, according to the distribution characteristic of the weight, an initial quantization parameter for quantizing the weight to reduce a quantization error in quantizing the weight. The quantization method provided by the embodiments of the present disclosure does not pre-define the quantization method used, but determines the quantization parameter used for quantizing the weight according to the distribution characteristic of the weight to reduce the quantization error, so that the effect of the neural network model is better under the same mapping overhead, and the mapping overhead is smaller under the same effect of the neural network model.

16 Claims, 8 Drawing Sheets

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2017/0293659 | A1* | 10/2017 | Huang | H03M 7/3066 |
| 2018/0089587 | A1* | 3/2018 | Suresh | G06F 17/16 |
| 2018/0314941 | A1* | 11/2018 | Lie | G06N 3/063 |
| 2019/0294413 | A1* | 9/2019 | Vantrease | G06F 7/5443 |
| 2019/0332926 | A1* | 10/2019 | Lie | G06N 3/063 |
| 2019/0347554 | A1* | 11/2019 | Choi | G06N 3/082 |
| 2020/0097818 | A1* | 3/2020 | Li | G06N 3/0464 |
| 2020/0134461 | A1* | 4/2020 | Chai | G06N 3/0464 |
| 2020/0302269 | A1* | 9/2020 | Ovtcharov | G06N 3/044 |
| 2020/0394522 | A1* | 12/2020 | Liu | G06N 3/063 |
| 2021/0089922 | A1* | 3/2021 | Lu | G06N 3/04 |
| 2022/0004810 | A1* | 1/2022 | Sinha | G06V 10/82 |
| 2022/0044114 | A1* | 2/2022 | Sriram | G06N 3/045 |
| 2022/0101133 | A1* | 3/2022 | Ardywibowo | G06F 18/24133 |
| 2022/0147821 | A1* | 5/2022 | Nakata | G06N 3/09 |
| 2022/0399904 | A1* | 12/2022 | Luo | H03M 13/1515 |
| 2023/0069536 | A1* | 3/2023 | Morrison | G06N 3/08 |
| 2023/0153571 | A1* | 5/2023 | Jang | G06N 3/08 706/15 |

* cited by examiner

QUANTIZATION METHOD AND QUANTIZATION APPARATUS FOR WEIGHT OF NEURAL NETWORK, AND STORAGE MEDIUM

CROSS-REFERENCE TO RELATED APPLICATIONS

The present application is a U.S. National Phase Entry of International Patent Application No. PCT/CN2021/137446, filed on Dec. 13, 2021, which claims priority of the Chinese Patent Application No. 202011558175.6, filed on Dec. 25, 2020, the disclosure of which is incorporated herein by reference in its entirety as part of the present application.

TECHNICAL FIELD

Embodiments of the present disclosure relate to a quantization method and quantization apparatus for a weight of a neural network, and a storage medium.

BACKGROUND

Neural network models are widely used in fields such as computer vision, speech recognition, natural language processing, and reinforcement learning, etc. However, neural network models are highly complex and thus can hardly be applied to edge devices (e.g., cellphones, smart sensors, wearable devices, etc.) with very limited computing speed and power.

A neural network, which is implemented on the basis of a crossbar-enabled analog computing-in-memory (CACIM) system, can reduce the complexity of neural network models, so that neural network models can be applied to edge devices. Specifically, the CACIM system includes a computing and storage unit that is capable of performing data computing where data is stored, thereby saving the overhead that is caused by data transportation. In addition, the computing and storage unit in the CACIM system can perform multiplication and addition operations on the basis of Kirchhoff's current law and Ohm's law, thereby reducing the computing overhead of the system.

SUMMARY

At least one embodiment of the present disclosure provides a quantization method for a weight of a neural network, the neural network is implemented on the basis of a crossbar-enabled analog computing-in-memory system, and the method includes: acquiring a distribution characteristic of the weight; and determining, according to the distribution characteristic of the weight, an initial quantization parameter for quantizing the weight to reduce a quantization error in quantizing the weight.

For example, the quantization method provided in at least one embodiment of the present disclosure further includes: quantizing the weight using the initial quantization parameter to obtain a quantized weight; and training the neural network using the quantized weight and updating the weight on the basis of a training result to obtain an updated weight.

For example, the quantization method provided in at least one embodiment of the present disclosure further includes: quantizing the weight using the initial quantization parameter to obtain a quantized weight; adding noise to the quantized weight to obtain a noised weight; and training the neural network using the noised weight and updating the weight on the basis of a training result to obtain an updated weight.

For example, in the quantization method provided in at least one embodiment of the present disclosure, training the neural network and updating the weight on the basis of the training result to obtain an updated weight include: performing forward propagation and backward propagation on the neural network; and updating the weight by using a gradient that is obtained by the backward propagation to obtain the updated weight.

For example, the quantization method provided in at least one embodiment of the present disclosure further includes: updating the initial quantization parameter on the basis of the updated weight.

For example, in the quantization method provided in at least one embodiment of the present disclosure, updating the initial quantization parameter on the basis of the updated weight includes: determining whether the updated weight matches the initial quantization parameter, in a case where the updated weight matches the initial quantization parameter, not updating the initial quantization parameter, and in a case where the updated weight does not match the initial quantization parameter, updating the initial quantization parameter.

For example, in the quantization method provided in at least one embodiment of the present disclosure, determining whether the updated weight matches the initial quantization parameter includes: performing a matching operation on the updated weight and the initial quantization parameter to obtain a matching operation result; and comparing the matching operation result with a threshold range, in a case where the matching operation result is within the threshold range, determining that the updated weight matches the initial quantization parameter; and in a case where the matching operation result is not within the threshold range, determining that the updated weight does not match the initial quantization parameter.

At least one embodiment of the present disclosure further provides a quantization apparatus for a weight of a neural network, the neural network is implemented on the basis of a crossbar-enabled analog computing-in-memory system, the apparatus includes a first unit and a second unit, the first unit is configured to acquire a distribution characteristic of the weight; and the second unit is configured to determine, according to the distribution characteristic of the weight, an initial quantization parameter for quantizing the weight to reduce a quantization error in quantizing the weight.

For example, the quantization apparatus provided in at least one embodiment of the present disclosure further includes a third unit and a fourth unit, the third unit is configured to quantize the weight using the initial quantization parameter to obtain a quantized weight; and the fourth unit is configured to train the neural network using the quantized weight and to update the weight on the basis of a training result to obtain an updated weight.

For example, the quantization apparatus provided in at least one embodiment of the present disclosure further includes a third unit, a fourth unit, and a fifth unit, the third unit is configured to quantize the weight using the initial quantization parameter to obtain a quantized weight; the fifth unit is configured to add noise to the quantized weight to obtain a noised weight; and the fourth unit is configured to train the neural network using the noised weight and to update the weight on the basis of a training result to obtain an updated weight.

For example, the quantization apparatus provided in at least one embodiment of the present disclosure further includes a sixth unit, the sixth unit is configured to update the initial quantization parameter on the basis of the updated weight.

For example, in the quantization apparatus provided in at least one embodiment of the present disclosure, the sixth unit is configured to determine whether the updated weight matches the initial quantization parameter, in a case where the updated weight matches the initial quantization parameter, the initial quantization parameter is not updated, and in a case where the updated weight does not match the initial quantization parameter, the initial quantization parameter is updated.

At least one embodiment of the present disclosure further provides a quantization apparatus for a weight of a neural network, the neural network is implemented on the basis of a crossbar-enabled analog computing-in-memory system, the apparatus includes: a processor; and a memory, including one or more computer program modules; the one or more computer program modules are stored in the memory and are configured to be executed by the processor, and the one or more computer program modules are used for implementing the quantization method provided in any one embodiment of the present disclosure.

At least one embodiment of the present disclosure further provides a storage medium for storing non-transitory computer-readable instructions, the non-transitory computer-readable instructions, when executed by a computer, implement the method provided in any one embodiment of the present disclosure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
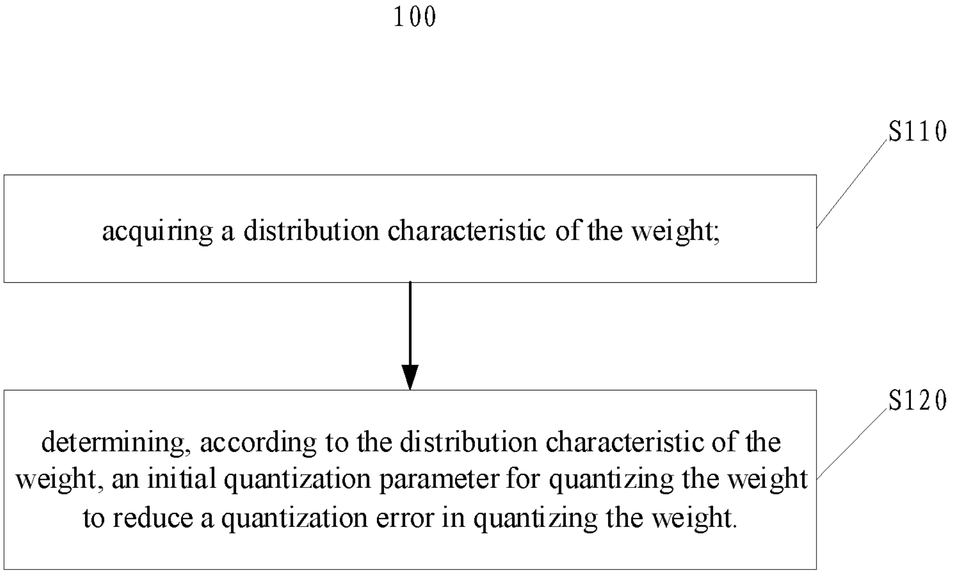
FIG. 1 is a flow chart of a quantization method for a weight of a neural network provided by at least one embodiment of the present disclosure.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Likewise, the terms "a", "an", "one" or "the" etc., do not denote a limitation of quantity, but mean that there is at least one. The terms "comprise," "comprising," "include," "including," etc., are intended to specify that the elements or the objects stated before these terms encompass the elements or the objects and equivalents thereof listed after these terms, but do not preclude the other elements or objects.

The present disclosure is described below through several specific embodiments. To keep the following description of the embodiments of the present disclosure clear and concise, detailed descriptions of well-known functions and well-known components may be omitted. When any component of an embodiment of the present disclosure appears in more than one drawing, the component is denoted by the same reference numeral in each drawing.

The implementation of a neural network using a crossbar-enabled analog computing-in-memory (CACIM) system requires mapping, that is, the weight of the neural network needs to be written to the computing and storage unit of the CACIM system. When performing the mapping described above, the weight can be quantized to reduce the precision of the weight, thereby reducing the mapping overhead. However, quantizing the weight will introduce a quantization error, thereby affecting the effect of the neural network model. It should be noted that in a digital computing system, the precision of a weight represents the number of bits used to represent the weight; whereas in the CACIM system, the precision of a weight represents the number of levels of analog devices that are used to represent the weight.

For example, in one example, the weight is a set of 32-bit floating-point numbers: [0.4266, 3.8476, 2.0185, 3.0996, 2.2692, 3.4748, 0.3377, 1.5991]; the quantization method of rounding towards negative infinity is used for quantizing the set of weight values, the quantized weight thus obtained is a set of 2-bit integers: [0, 3, 2, 3, 2, 3, 0, 1], and the difference between the weight and the quantized weight is the quantization error.

In a method for quantizing a weight of a neural network implemented by the CACIM system, the quantization method is designed on the basis of a digital computing system, for example, the quantization method includes a quantization method pre-defined as uniform quantization, a quantization method for quantizing numbers or rounding towards negative infinity. However, the quantization methods described above do not fully consider the distribution characteristic of the weight of the neural network. The pre-defined quantization method solves a optimization problem with constraints and cannot obtain the minimum quantization error, thus leading to a poor effect of the neural network model.

At least one embodiment of the present disclosure provides a quantization method for a weight of a neural network, the neural network is implemented on the basis of a crossbar-enabled analog computing-in-memory system, and the quantization method includes: acquiring a distribution characteristic of the weight; and determining, according to the distribution characteristic of the weight, an initial quantization parameter for quantizing the weight to reduce a quantization error in quantizing the weight.

Embodiments of the present disclosure also provide a quantization apparatus and a storage medium corresponding to the quantization method described above.

The quantization method and quantization apparatus for the weight of the neural network, and the storage medium provided by the embodiments of the present disclosure make use of the characteristic that the weight in the CACIM system is represented by an analog quantity, and the present disclosure proposes a generalized quantization method based on the distribution characteristic of the weight. Such quantization method does not pre-define the quantization method used (for example, it does not pre-define using a quantization method designed for a digital computing system), but determines a quantization parameter used for quantizing the weight according to the distribution characteristic of the weight to reduce a quantization error, so that the effect of the neural network model is better under the same mapping overhead, and the mapping overhead is smaller under the same effect of the neural network model.

Embodiments and examples of the present disclosure will be described in detail below in conjunction with the appended drawings.

FIG. 1 is a flow chart of a quantization method for a weight of a neural network provided by at least one embodiment of the present disclosure. In the embodiments of the present disclosure, the neural network is implemented on the basis of a crossbar-enabled analog computing-in-memory system. For example, as shown in FIG. 1, the quantization method 100 includes steps S110 and S120.

Step S110: acquiring a distribution characteristic of the weight.

Step S120: determining, according to the distribution characteristic of the weight, an initial quantization parameter for quantizing the weight to reduce a quantization error in quantizing the weight.

For example, the crossbar-enabled analog computing-in-memory system uses a resistive random access memory cell as a computing and storage unit, and then uses a resistive random access memory cell array to implement the neural network.

It should be noted that, in the embodiments of the present disclosure, the specific types of the resistive random access memory cell are not limited. For example, the resistive random access memory cell may adopt a 1R structure, that is, the resistive random access memory cell only includes one varistor. For another example, the resistive random access memory cell may also adopt a 1T1R structure, that is, the resistive random access memory cell includes a transistor and a varistor.

Figure 2:
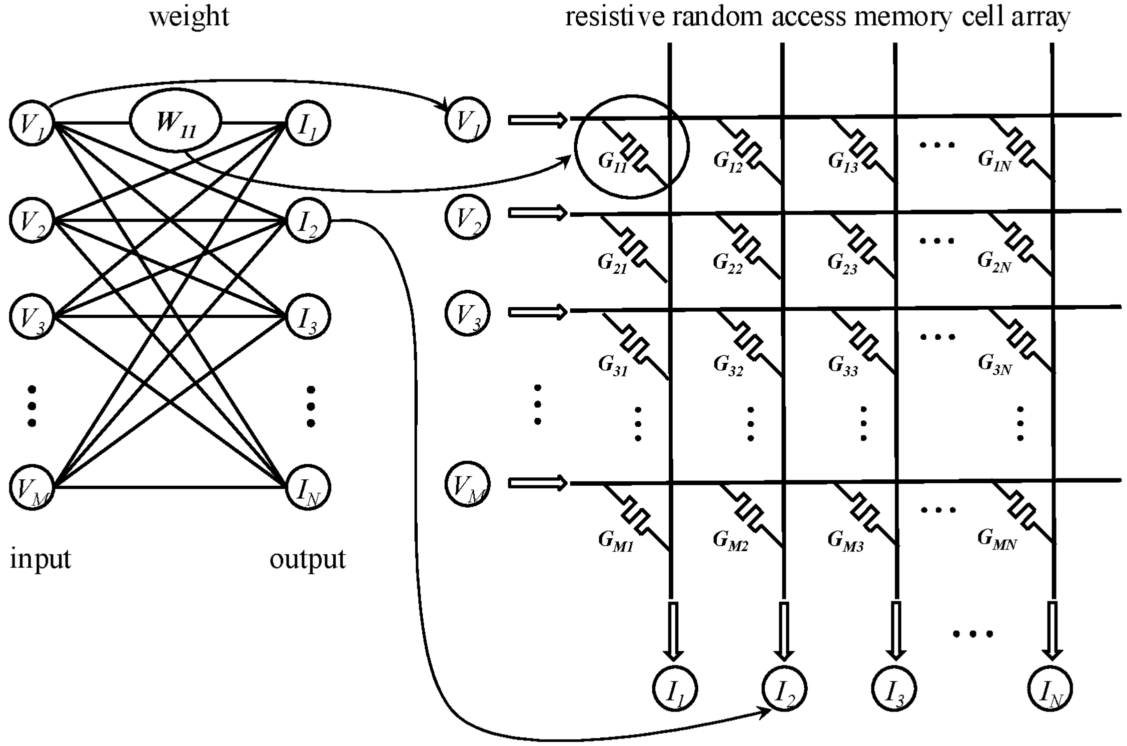
FIG. 2 illustrates a schematic diagram of an example of a neural network according to at least one embodiment of the present disclosure.

For example, FIG. 2 illustrates a schematic diagram of one example of a neural network according to embodiments of the present disclosure. In the example shown in FIG. 2, a resistive random access memory cell array in the $M^{th}$ row and $N^{th}$ column is used for implementing a neural network including M inputs and N outputs, M and N are positive integers greater than 1. As shown in FIG. 2, the M inputs (for example, voltage excitation $V_1$ to $V_M$) of the resistive random access memory cell array are used as the inputs of the neural network, and the conductance value (for example, $G_{ij}$) of the resistive random access memory cell in the resistive random access memory cell array corresponds to the weight of the neural network (for example, the conductance value $G_{11}$ corresponds to the weight $W_{11}$), and the N outputs (for example, output currents $I_1$ to $I_N$) of the resistive random access memory cell array are used as the outputs of the neural network. For example, according to Kirchhoff's current law and Ohm's law, the resistive random access memory cell array can realize the multiplication and addition operation by the following formula:

$$I_j = \sum_{i=1}^{M} (V_i G_{ij}) \text{ where } i = 1, \ldots, M, \text{ and } j = 1, \ldots, N.$$

It should be noted that the example shown in FIG. 2 is only exemplary, and embodiments of the present disclosure include but are not limited thereto. For example, multiple hidden layers (not shown in FIG. 2) may be included between the inputs and outputs of the neural network. For example, a fully connected structure or a non-fully connected structure may be used inside the neural network. For example, an activation function circuit (not shown in FIG. 2) may also be included inside the neural network.

In the embodiments of the present disclosure, the weight of the neural network can be represented by the conductance values of the resistive random access memory cell, that is, the weight of the neural network can be represented by an analog quantity, so that the quantization method for the weight may not be limited to quantization methods designed for a digital computing system.

For step S110, the distribution characteristic of the weight can be acquired by various means, and no limitation is made in the embodiments of the present disclosure in this regard.

For example, the distribution characteristic of the weight can be acquired directly. For another example, the weight of the neural network can be acquired firstly, and then the distribution characteristic of the weight can be acquired indirectly by computing.

For example, the acquiring may include multiple means to acquire data, such as reading and importing, etc. For example, the distribution characteristic of the weight may be pre-stored in a storage medium, and the distribution characteristic of the weight may be acquired by directly accessing and reading the storage medium.

For example, the distribution characteristic of the weight may include a probability density distribution of the weight.

Figure 3:
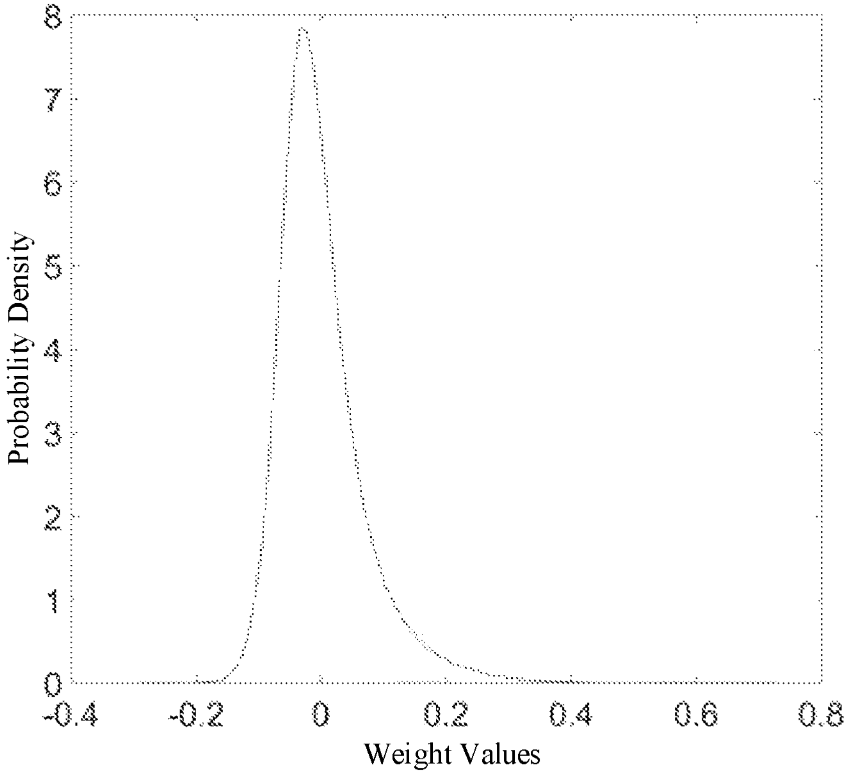
FIG. 3 illustrates an example of a probability density distribution of a weight of a neural network.

For example, FIG. 3 illustrates an example of the probability density distribution of the weight of a neural network. FIG. 3 shows the probability density distribution of 512,000 weights, the abscissa is the weight and the ordinate is the probability density of the weight.

It should be noted that in the embodiments of the present disclosure, taking the probability density distribution of the weight as the distribution characteristic of the weight is only exemplary, and the embodiments of the present disclosure include but are not limited thereto. For example, other characteristics of the weight may also be used as the distribution characteristics of the weight. For example, the distribution characteristic of the weight may also include a cumulative probability density distribution of the weight.

For step S120, according to the distribution characteristic of the weight, the quantization parameter for quantizing the weight may be determined with the aim of reducing the quantization error in quantizing the weight, for example, with the aim of minimizing the quantization error.

For example, in some embodiments, the quantization parameter may be determined directly according to the distribution characteristic of the weight.

For example, in one example, the quantization parameter may be determined by using the Lloyd algorithm according to the distribution characteristic of the weight. For example, for the probability density distribution of the weight shown in FIG. 3, if quantization of four levels of numbers is to be performed, the initial quantization parameter can be determined by using the Lloyd algorithm, the initial quantization parameter including four quantization values: [−0.0618, −0.0036, 0.07, 0.1998] and three cut-off points: [−0.0327, 0.0332, 0.1349], the cut-off point is generally the mean value of two adjacent quantization values, for example, the cut-off point −0.0327 is the mean value of the two adjacent quantization values −0.0618 and −0.0036.

It should be noted that in the embodiments of the present disclosure, the Lloyd algorithm is only exemplary, and the embodiments of the present disclosure include but are not limited thereto. For example, the quantization parameter may also be determined by other algorithms aiming at minimizing the quantization error. For example, the quantization parameter may be determined using the K-average clustering algorithm according to the distribution characteristic of the weight.

For another example, in some embodiments, the quantization parameter may also be determined indirectly according to the distribution characteristic of the weight.

For example, in one example, determining, according to the distribution characteristic of the weight, the initial quantization parameter for quantizing the weight to reduce the quantization error in quantizing the weight includes: acquiring a candidate distribution library, in which multiple distribution models are stored in the candidate distribution library; selecting, according to the distribution characteristic of the weight, a distribution model corresponding to the distribution characteristic from the candidate distribution library; and determining, according to the distribution model as selected, the initial quantization parameter for quantizing the weight to reduce the quantization error in quantizing the weight.

For example, the candidate distribution library may be preset, and may be acquired by various means such as reading and importing. No limitation is made in the embodiments of the present disclosure in this regard.

For example, selecting, according to the distribution characteristic of the weight, a distribution model corresponding to the distribution characteristic from the candidate distribution library includes: analyzing the distribution characteristic of the weight, and selecting, from the candidate distribution library, the distribution model with the distribution characteristic that is closest to the distribution characteristic of the weight.

For example, by analyzing the probability density distribution of a set of weight values shown in FIG. 3, it can be determined that the Gaussian distribution model in the candidate distribution library is the closest to the distribution characteristic of the set of weight values shown in FIG. 3, and thus the initial quantization parameter can be determined using the Lloyd algorithm according to the Gaussian distribution.

In the embodiments of the present disclosure, by using the characteristic that the weight in the CACIM system is represented by the analog quantity, and the present disclosure proposes the generalized quantization method based on the distribution characteristic of the weight. Such quantization method does not pre-define the quantization method used (for example, it does not pre-define using the quantization method designed for a digital computing system), but determines the quantization parameter used for quantizing the weight according to the distribution characteristic of the weight to reduce the quantization error, so that the effect of the neural network model is better under the same mapping overhead, and the mapping overhead is smaller under the same effect of the neural network model.

For example, the quantization method 100 provided by at least one embodiment of the present disclosure further includes steps S130 and S140.

Step S130: quantizing the weight using the initial quantization parameter to obtain a quantized weight.

Step S140: training the neural network using the quantized weight, and updating the weight on the basis of a training result to obtain an updated weight.

For step S130, the quantized weight with reduced precision can be obtained by quantizing the weight using the initial quantization parameter.

For example, in one example, the initial quantization parameter as determined includes four quantization values: [−0.0618, −0.0036, 0.07, 0.1998] and three cut-off points: [−0.0327, 0.0332, 0.1349]. Thus, the quantized weight, which is obtained by quantizing the weight using the initial quantization parameter, can be expressed as:

$$y = f(x) = \begin{cases} -0.0618 & x < -0.0327 \\ -0.0036 & -0.0327 \le x < 0.0332 \\ 0.07 & 0.0332 \le x < 0.1349 \\ 0.1998 & x \ge 0.1349 \end{cases}$$

where x refers to a weight value and y refers to the quantized weight.

For example, a set of weight values are [−0.0185, −0.0818, 0.1183, −0.0102, 0.1428], and a set of quantized weight values [−0.0036, −0.0618, 0.07, −0.0036, 0.1998] can be obtained after quantization by using y=f(x).

For step S140, after the quantized weight is obtained, the neural network is trained using the quantized weight, for example, off-chip training can be performed, and the weight is updated on the basis of the training result.

For example, in one example, training the neural network, and updating the weight on the basis of the training result to obtain an updated weight include: performing forward propagation and backward propagation on the neural network; and updating the weight by using a gradient that is obtained by the backward propagation to obtain the updated weight.

For example, in the process of forward propagation, the input of the neural network is processed layer by layer to generate output; in the process of backward propagation, by taking the sum of squares of the output and the expected error as the target function, the partial derivative of the target function to the weight is obtained layer by layer, which constitutes the gradient of the target function to the weight vector; and then the weight is updated on the basis of the gradient.

In the embodiments of the present disclosure, only the influence of the quantization error on the effect of the neural network model is considered. However, both the write error and the read error of the weight may cause the effect of the neural network model to degrade, resulting in poor robustness. In some other embodiments of the present disclosure, noise is added to the quantized weight, and off-chip training is performed using the quantized weight to which noise is added so that the updated weight as obtained has better robustness.

For example, the quantization method 100 provided by at least one embodiment of the present disclosure further includes steps S130', S135 and S140'.

Step S130': quantizing the weight using the initial quantization parameter to obtain a quantized weight.

Step S135: adding noise to the quantized weight to obtain a noised weight.

Step S140': training the neural network using the noised weight, and updating the weight on the basis of a training result to obtain an updated weight.

For step S130', it is similar to step S130, and no further detail will be provided herein.

For step S135, after obtaining the quantized weight, the noised weight can be obtained by adding noise to the quantized weight.

For example, in one example, after obtaining the quantized weight, the noised weight can be obtained by adding Gaussian distribution noise to the quantized weight. For example, the mean value of the Gaussian distribution noise can be 0, and the standard deviation can be the maximum value of the absolute values of the quantized weight being multiplied by a certain proportional coefficient, such as 2%.

For example, the set of quantized weight values obtained are [−0.0036, −0.0618, 0.07, −0.0036, 0.1998], the mean value of the Gaussian distribution noise is 0, and the standard deviation is 0.1998*0.02=0.003996; then a set of noise values [0.0010, 0.0019, 0.0047, −0.0023, −0.0015] can be obtained, and by adding this set of noise values to the set of quantized weight values, a set of noised weight values [−0.0026, −0.0599, 0.0747, −0.0058, 0.1983] can be obtained.

For step S140', it is similar to step S140, and the only difference lies in using the noised weight to replace the quantized weight for off-chip training. No further detail will be provided herein.

In the embodiments of the present disclosure, the noised weight obtained by adding the noise to the quantized weight is used for performing off-chip training, so that the updated weight as obtained has better robustness. In addition, in the embodiments of the present disclosure, off-chip training is performed by combining noise addition and quantization rather than performed separately, thereby effectively reducing training costs.

For example, the quantization method 100 provided by at least one embodiment of the present disclosure further includes step S150.

Step S150: updating the initial quantization parameter on the basis of the updated weight.

For step S150, the initial quantization parameter can be adjusted according to the updated weight.

For example, in one example, the initial quantization parameter is updated once the updated weight is obtained.

For example, in another example, updating the initial quantization parameter on the basis of the updated weight includes: determining whether the updated weight matches the initial quantization parameter; in a case where the updated weight matches the initial quantization parameter, not updating the initial quantization parameter; and in a case where the updated weight does not match the initial quantization parameter, updating the initial quantization parameter. In this example, the initialization parameter is updated only when the updated weight does not match the initial quantization, thereby effectively reducing the update frequency.

For example, determining whether the updated weight matches the initial quantization parameter includes: performing a matching operation on the updated weight and the initial quantization parameter to obtain a matching operation result; comparing the matching operation result with a threshold range; in a case where the matching operation result is within the threshold range, determining that the updated weight matches the initial quantization parameter; and in a case where the matching operation result is not within the threshold range, determining that the updated weight does not match the initial quantization parameter.

For example, the operation $A \odot B$ can be defined, where A and B are two matrices with the same dimension, and the matching operation $A \odot B$ means performing a matrix point multiplication operation on matrix A and matrix B and summing the elements in the matrix point multiplication operation result; for example, assuming that the weight matrix is W and the updated weight matrix is qW, the matching operation can be defined as $(W \odot qW)/(qW \odot qW)$, for example, the threshold range is [0.9, 1.1]; after performing the matching operation, if the matching operation result is within the threshold range, the initial quantization parameter is not updated, and if the matching operation result is not within the threshold range, the initial quantization parameter is updated. It should be noted that the matching operation and threshold range described above are only exemplary rather than limitations to the present disclosure.

In the foregoing embodiments and examples of the present disclosure, the off-chip training that is performed on the neural network is taken as an example for illustration, and embodiments of the present disclosure include but are not limited thereto. For example, multiple trainings can also be performed on the neural network to update the weight and update the quantization parameter.

Figure 4:
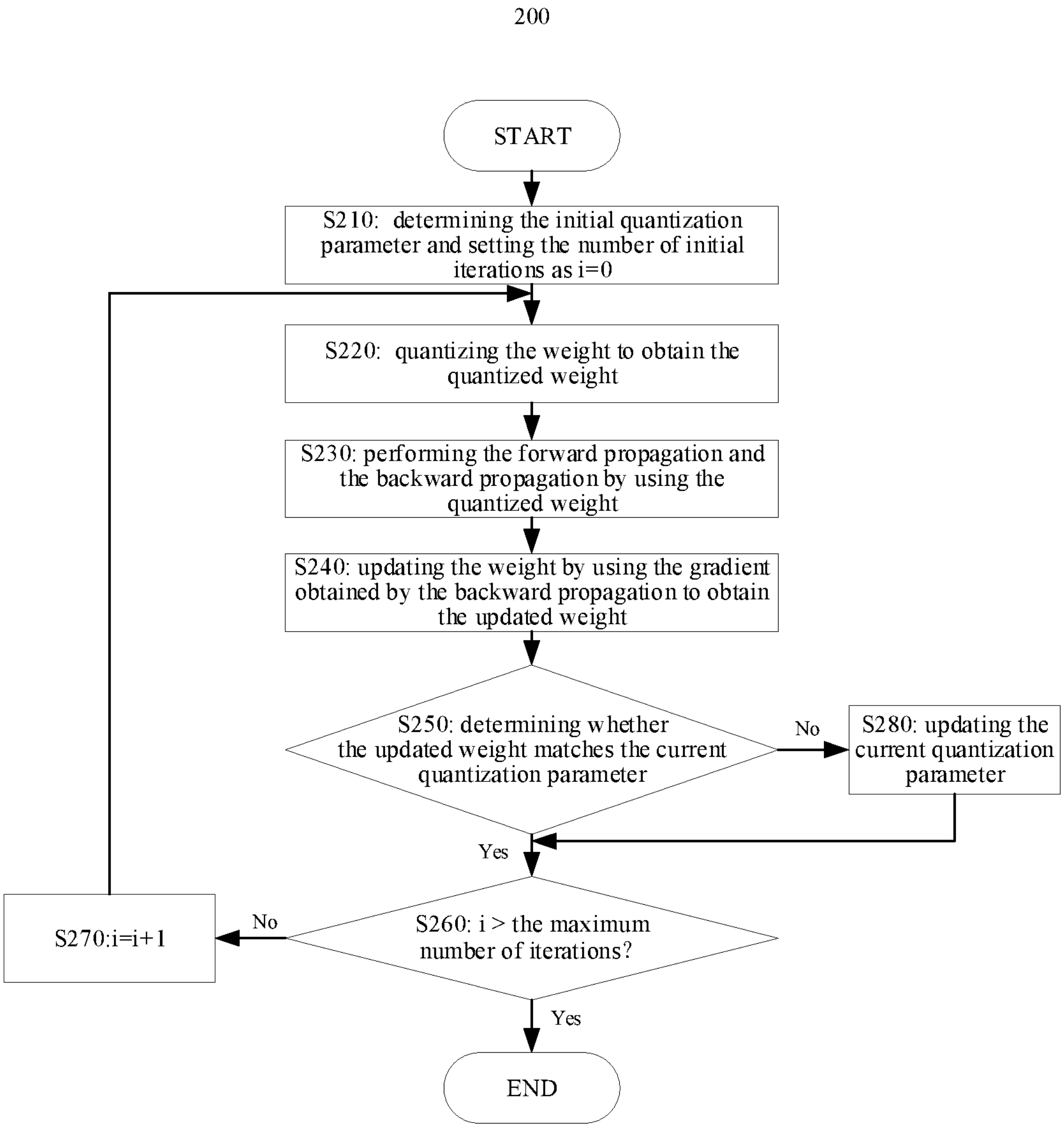
FIG. 4 illustrates a flow chart of a quantization method provided by at least one embodiment of the present disclosure.

For example, FIG. 4 illustrates a flow chart of a quantization method 200 provided by at least one embodiment of the present disclosure. In the example shown in FIG. 4, the quantization method 200 includes steps S210 to S280, which perform multiple trainings on the neural network to update the weight and the quantization parameter, for example, a quantized weight is used for each training. As shown in FIG. 4, at step S210, the initial quantization parameter is determined and the number of initial iterations i is set as i=0; at step S220, the weight is quantized to obtain the quantized weight; at step S230, the forward propagation and the backward propagation are performed by using the quantized weight; at step S240, the weight is updated by using the gradient obtained by the backward propagation to obtain the updated weight; at step S250, it is determined whether the updated weight matches the current quantization parameter; if yes, step S260 will be proceeded, and if no, step S280 will be performed; at step S260, it is determined whether the number of iterations is greater than the maximum number of iterations; if yes, the process ends, and if not, step S270 will be proceeded; at step S270, 1 is added to the number of iterations (i.e., i=i+1), and then step S220 is performed; at step S280, the current quantization parameter is updated. In this example, in the case where i is equal to 0, the current quantization parameter is the initial quantization parameter; in the case where i is equal to any other value, if step S280 has not been performed, the current quantization parameter is the initial quantization parameter, and if step S280 has been performed, the current quantization parameter is the latest updated quantization parameter. It should be noted that, in this example, the process of performing each of the multiple trainings on the neural network is basically the same as the process in the related embodiments and examples in which one training is performed on the neural network in the quantization method 100; and no further detail will be provided herein.

Figure 5:
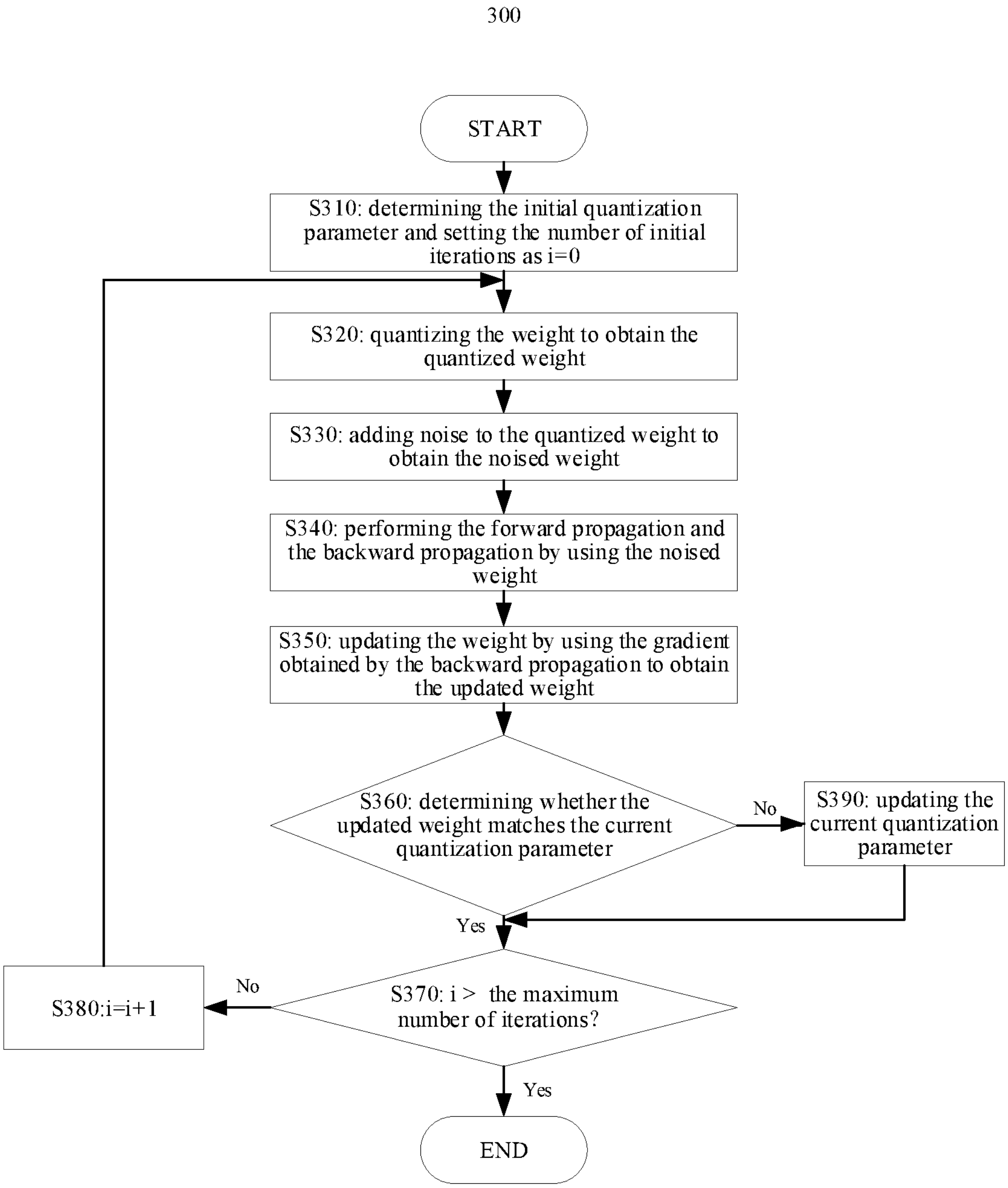
FIG. 5 illustrates another flow chart of a quantization method provided by at least one embodiment of the present disclosure.

For example, FIG. 5 illustrates another flow chart of a quantization method 300 provided by at least one embodiment of the present disclosure. In the example shown in FIG. 5, the quantization method 300 includes steps S310 to S390, which perform multiple trainings on the neural network to update the weight and the quantization parameter, for example, each training is performed using the noised weight obtained by adding noise to the quantized weight. As shown in FIG. 5, at step S310, the initial quantization parameter is determined and the number of initial iterations i is set as i=0; at step S320, the weight is quantized to obtain the quantized weight; at step S330, noise is added to the quantized weight to obtain the noised weight; at step S340, the forward propagation and the backward propagation are performed by using the noised weight; at step S350, the weight is updated by using the gradient obtained by the backward propagation to obtain the updated weight; at step S360, it is determined whether the updated weight matches the current quantization parameter; if yes, step S370 will be proceeded, and if no, step S390 will be performed; at step S370, it is determined whether the number of iterations is greater than the maximum number of iterations; if yes, the process ends, and if not, step S380 will be proceeded; at step S380, 1 is added to the number of iterations (i.e., i=i+1), and then step S320 is performed; at step S390, the current quantization parameter is updated. In this example, in the case where i is equal to 0, the current quantization parameter is the initial quantization parameter; in the case where i is equal to any other value, if step S390 has not been performed, the current quantization parameter is the initial quantization parameter, and if step S390 has been performed, the current quantization parameter is the latest updated quantization parameter. It should be noted that in this example, the process of performing each of the multiple trainings on the neural network is basically the same as the process in the related embodiments and examples in which one training is performed on the neural network as described above. In order to avoid repetition, no further detail will be provided.

Figure 6:
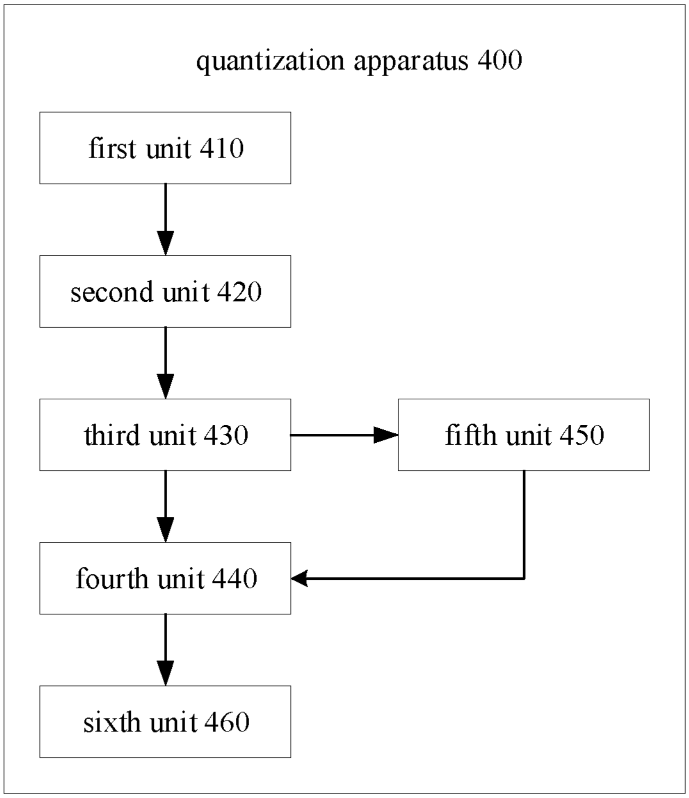
FIG. 6 is a schematic block diagram of a quantization apparatus for a weight of a neural network provided by at least one embodiment of the present disclosure.

FIG. 6 illustrates a flow chart of a quantization apparatus 400 for a weight of a neural network provided by at least one embodiment of the present disclosure. In the embodiments of the present disclosure, the neural network is implemented on the basis of a crossbar-enabled analog computing-in-memory system. As shown in FIG. 6, the quantization apparatus 400 includes a first unit 410 and a second unit 420.

The first unit 410 is configured to acquire a distribution characteristic of the weight. For example, the first unit 410 implements the step S110; for the specific implementation method, reference may be made to relevant descriptions of the step S110, and no further detail will be provided herein.

The second unit 420 is configured to determine, according to the distribution characteristic of the weight, an initial quantization parameter for quantizing the weight to reduce a quantization error in quantizing the weight. For example, the first unit 420 implements the step S120; for the specific implementation method, reference may be made to relevant descriptions of the step S120, and no further detail will be provided herein.

For example, the quantization apparatus 400 provided by at least one embodiment of the present disclosure further includes a third unit 430 and a fourth unit 440.

The third unit 430 is configured to quantize the weight using the initial quantization parameter to obtain a quantized weight. For example, the third unit 430 implements the step S130; for the specific implementation method, reference may be made to relevant descriptions of the step S130, and no further detail will be provided herein.

The fourth unit 440 is configured to train the neural network using the quantized weight and to update the weight on the basis of a training result to obtain an updated weight. For example, the fourth unit 440 implements the step S140; for the specific implementation method, reference may be made to relevant descriptions of the step S140, and no further detail will be provided herein.

For example, the quantization apparatus 400 provided by at least one embodiment of the present disclosure further includes a third unit 430, a fourth unit 440, and a fifth unit 450.

The third unit 430 is configured to quantize the weight using the initial quantization parameter to obtain a quantized weight. For example, the third unit 430 implements the step S130'; for the specific implementation method, reference may be made to relevant descriptions of the step S130', and no further detail will be provided herein.

The fifth unit 450 is configured to add noise to the quantized weight to obtain a noised weight. For example, the fifth unit 450 implements the step S135; for the specific implementation method, reference may be made to relevant descriptions of the step S135, and no further detail will be provided herein.

The fourth unit 440 is configured to train the neural network using the noised weight and to update the weight on the basis of the training result to obtain an updated weight. For example, the fourth unit 440 implements the step S140'; for the specific implementation method, reference may be made to relevant descriptions of the step S140', and no further detail will be provided herein.

For example, the quantization apparatus 400 provided by at least one embodiment of the present disclosure further includes a sixth unit 460.

The sixth unit 460 is configured to update the initial quantization parameter on the basis of the updated weight. For example, the sixth unit 460 implements the step S150; for the specific implementation method, reference may be made to relevant descriptions of step the S150, and no further detail will be provided herein.

For example, in the quantization apparatus 400 provided by at least one embodiment of the present disclosure, the sixth unit 460 is configured to determine whether the updated weight matches the initial quantization parameter, and n a case where the updated weight matches the initial quantization parameter, the initial quantization parameter is not updated, and in a case where the updated weight does not match the initial quantization parameter, the initial quantization parameter is updated. For example, the sixth unit 460 may determine whether to update the initial quantization parameter according to whether the updated weight matches the initial quantization parameter. For the specific implementation method, reference may be made to the relevant description in the example of the step S150, and no further detail will be provided herein.

It should be noted that the various units in the quantization apparatus 400 shown in FIG. 6 may be respectively configured as software, hardware, firmware or any combination of the above-mentioned items to perform specific functions. For example, these units may correspond to application specific integrated circuits, pure software codes, or units combining software and hardware. As an example, the quantization apparatus 400 shown in FIG. 6 may be a PC computer, a tablet device, a personal digital assistant, a smart phone, a web application or any other device capable of executing program instructions, but is not limited thereto.

In addition, as described above, although the quantization apparatus 400 is divided into units for performing corresponding processing respectively, it is clear to those skilled in the art that the processing performed by each unit may also be performed without any specific unit division or when there is no clear demarcation between units. In addition, the quantization apparatus 400 shown in FIG. 6 is not limited to include the units described above, but some other units (e.g., a storage unit, a data processing unit, etc.) may also be added as required, or the above units may be combined.

Figure 7:
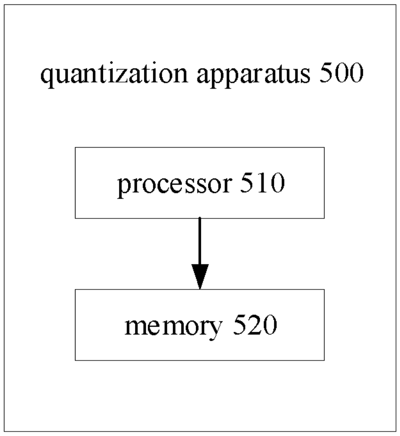
FIG. 7 is another schematic block diagram of a quantization apparatus for a weight of a neural network provided by at least one embodiment of the present disclosure.

FIG. 7 is a schematic block diagram of a quantization apparatus 500 for a weight of a neural network provided by at least one embodiment of the present disclosure. In the embodiments of the present disclosure, the neural network is implemented on the basis of a crossbar-enabled analog computing-in-memory system. As shown in FIG. 7, the quantization apparatus 500 includes a processor 510 and a memory 520. The memory 520 includes one or more computer program modules (e.g., non-transitory computer readable instructions). The processor 510 is configured to execute one or more computer program modules to implement one or more steps of the quantization method 100, 200 or 300 that are described above.

For example, the processor 510 may be a central processing unit (CPU), a digital signal processor (DSP), or any other form of processing units with data processing capabilities and/or program execution capabilities, such as field programmable gate arrays (FPGAs); for example, the central processing unit (CPU) can be an X86, ARM architecture, or the like. The processor 510 can be a general-purpose processor or a special-purpose processor, which can control other components in the quantization apparatus 500 to perform desired functions.

For example, the memory 520 may include any combination of one or more computer program products, the computer program product may include various forms of computer-readable storage media, such as volatile memory and/or non-volatile memory. The volatile memory may include, for example, random access memory (RAM) and/or cache memory. The non-volatile memory may include, for example, read-only memory (ROM), hard disks, erasable programmable read-only memory (EPROM), compact disk read-only memory (CD-ROM), USB memory, flash memory, and the like. One or more computer program modules can be stored on the computer-readable storage medium, and the processor 510 can run one or more computer program modules to realize various functions of the quantization apparatus 500. Various application programs, various data and various data that is used and/or generated by the application programs can also be stored in the computer-readable storage medium.

Figure 8:
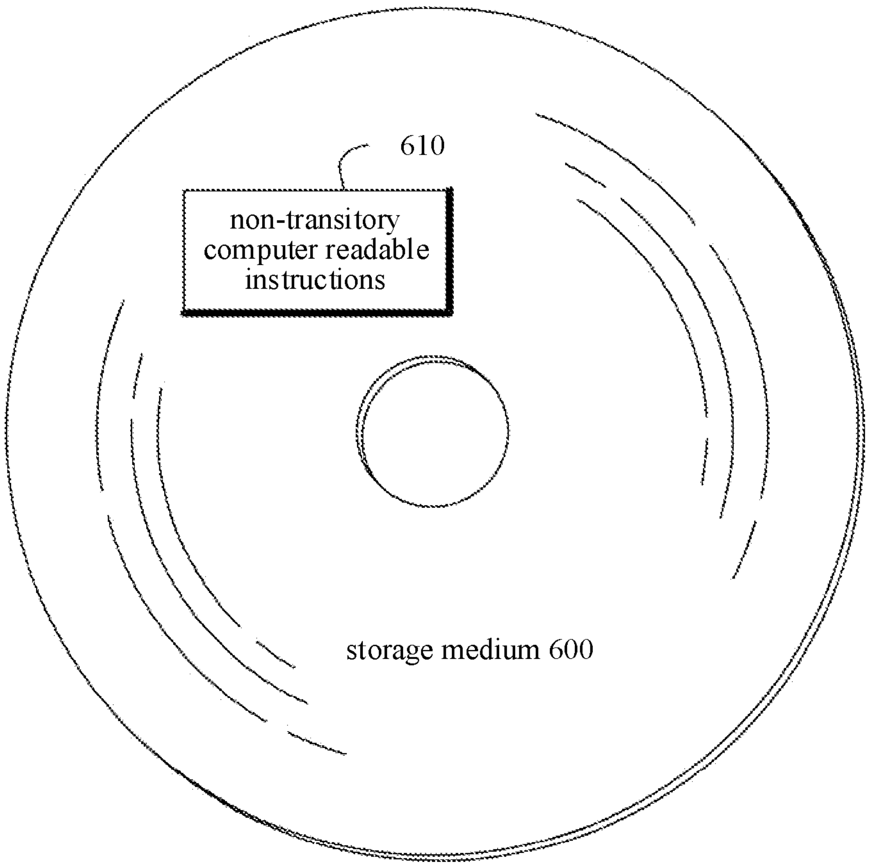
FIG. 8 is a schematic diagram of a storage medium provided by at least one embodiment of the present disclosure.

FIG. 8 is a schematic diagram of a storage medium provided by at least one embodiment of the present disclosure. As shown in FIG. 8, the storage medium 600 is used for storing non-transitory computer readable instructions 610. For example, the non-transitory computer readable instructions 610, when executed by a computer, perform one or more steps of the quantization method 100, 200 or 300 that are described above.

It should be noted that for the sake of clarity and brevity, the embodiments of the present disclosure do not present all components of the quantization apparatus 400, apparatus 500 and the storage medium 600. In order to realize the necessary functions of the quantization apparatus 400, apparatus 500 and the storage medium 600, those skilled in the art may provide and configure other components that are not shown according to specific requirements. No limitation is made in the embodiments of the present disclosure in this regard.

In addition, in the embodiments of the present disclosure, for the specific functions and technical effects of the quantization apparatus 400, apparatus 500 and the storage medium 600, reference may be made to the description about the quantization method 100, 200 or 300 hereinabove, and no further details will be provided herein.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure may be combined.

The above are merely particular embodiments of the present disclosure but are not limitative to the scope of the present disclosure; any of those skilled familiar with the related arts may easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. A quantization method for a weight of a neural network, wherein the neural network is implemented on the basis of a crossbar-enabled analog computing-in-memory system, and the method comprises:

acquiring a distribution characteristic of the weight; and determining, according to the distribution characteristic of the weight, an initial quantization parameter for quantizing the weight to reduce a quantization error in quantizing the weight;

wherein determining, according to the distribution characteristic of the weight, the initial quantization parameter for quantizing the weight to reduce the quantization error in quantizing the weight comprises:

acquiring a candidate distribution library, wherein multiple distribution models are stored in the candidate distribution library;

selecting, according to the distribution characteristic of the weight, a distribution model corresponding to the distribution characteristic from the candidate distribution library; and determining, according to the distribution model as selected, the initial quantization parameter for quantizing the weight to reduce the quantization error in quantizing the weight.

2. The method according to claim 1, further comprising:

quantizing the weight using the initial quantization parameter to obtain a quantized weight; and training the neural network using the quantized weight and updating the weight on the basis of a training result to obtain an updated weight.

3. The method according to claim 2, further comprising:

quantizing the weight using the initial quantization parameter to obtain a quantized weight;

adding noise to the quantized weight to obtain a noised weight; and training the neural network using the noised weight and updating the weight on the basis of a training result to obtain an updated weight.

4. The method according to claim 1, further comprising:

quantizing the weight using the initial quantization parameter to obtain a quantized weight;

adding noise to the quantized weight to obtain a noised weight; and training the neural network using the noised weight and updating the weight on the basis of a training result to obtain an updated weight.

5. The method according to claim 2, wherein training the neural network and updating the weight on the basis of the training result to obtain an updated weight comprise:

performing forward propagation and backward propagation on the neural network; and updating the weight by using a gradient that is obtained by the backward propagation to obtain the updated weight.

6. The method according to claim 5, further comprising:

updating the initial quantization parameter on the basis of the updated weight.

7. The method according to claim 6, wherein updating the initial quantization parameter on the basis of the updated weight comprises:

determining whether the updated weight matches the initial quantization parameter, in a case where the updated weight matches the initial quantization parameter, not updating the initial quantization parameter, and in a case where the updated weight does not match the initial quantization parameter, updating the initial quantization parameter.

8. The method according to claim 7, wherein determining whether the updated weight matches the initial quantization parameter comprises:

performing a matching operation on the updated weight and the initial quantization parameter to obtain a matching operation result; and comparing the matching operation result with a threshold range, in a case where the matching operation result is within the threshold range, determining that the updated weight matches the initial quantization parameter; and in a case where the matching operation result is not within the threshold range, determining that the updated weight does not match the initial quantization parameter.

9. The method according to claim 4, wherein training the neural network and updating the weight on the basis of the training result to obtain an updated weight comprise:

performing forward propagation and backward propagation on the neural network; and updating the weight by using a gradient that is obtained by the backward propagation to obtain the updated weight.

10. A quantization apparatus for a weight of a neural network, wherein the neural network is implemented on the basis of a crossbar-enabled analog computing-in-memory system, the apparatus comprises:

a processor; and a memory, comprising one or more computer program modules;

wherein the one or more computer program modules are stored in the memory and are configured to be executed by the processor, and the one or more computer program modules are used for implementing:

acquiring a distribution characteristic of the weight; and determining, according to the distribution characteristic of the weight, an initial quantization parameter for quantizing the weight to reduce a quantization error in quantizing the weight;

wherein determining, according to the distribution characteristic of the weight, the initial quantization parameter for quantizing the weight to reduce the quantization error in quantizing the weight comprises:

acquiring a candidate distribution library, wherein multiple distribution models are stored in the candidate distribution library;

selecting, according to the distribution characteristic of the weight, a distribution model corresponding to the distribution characteristic from the candidate distribution library; and determining, according to the distribution model as selected, the initial quantization parameter for quantizing the weight to reduce the quantization error in quantizing the weight.

11. The apparatus according to claim 10, wherein the one or more computer program modules are further used for implementing:

quantizing the weight using the initial quantization parameter to obtain a quantized weight; and training the neural network using the quantized weight and updating the weight on the basis of a training result to obtain an updated weight.

12. The apparatus according to claim 11, wherein the one or more computer program modules are further used for implementing:

updating the initial quantization parameter on the basis of the updated weight.

13. The apparatus according to claim 12, wherein the one or more computer program modules are further used for implementing: determining whether the updated weight matches the initial quantization parameter, in a case where the updated weight matches the initial quantization parameter, the initial quantization parameter is not updated, and in a case where the updated weight does not match the initial quantization parameter, the initial quantization parameter is updated.

14. The apparatus according to claim 10, wherein the one or more computer program modules are further used for implementing:

quantizing the weight using the initial quantization parameter to obtain a quantized weight;

adding noise to the quantized weight to obtain a noised weight; and training the neural network using the noised weight and updating the weight on the basis of a training result to obtain an updated weight.

15. The apparatus according to claim 14, wherein the one or more computer program modules are further used for implementing:

updating the initial quantization parameter on the basis of the updated weight.

16. A storage medium for storing non-transitory computer-readable instructions, wherein the non-transitory computer-readable instructions, when executed by a computer, implement the method according to claim 1.

* * * * *